260-400

SEARCH ROOM

United States Patent Office

Re. 23,893
Reissued Nov. 2, 1954

23,893

DIKETO UNSATURATED ACID AND ESTERS

Joseph Nichols, Princeton, N. J., assignor to Interchemical Corporation, New York, N. Y., a corporation of Ohio No Drawing. Original No. 2,623,889, dated December 30, 1952, Serial No. 204,470, January 4, 1951. Application for reissue December 30, 1953, Serial No. 401,444

4 Claims. (Cl. 260—406)

Matter enclosed in heavy brackets [ ] appears in the original patent but forms no part of this reissue specification; matter printed in italics indicates the additions made by reissue.

This invention relates to diketo *10,11*[9,10]-octadecenoic acid and esters, and to their method of preparation.

The preparation of 12-keto oleic acid, 12-keto elaidic acid and esters thereof has been disclosed in U. S. patent application Serial Number 204,469. It has now been found that further oxidation, in solution in glacial acetic acid containing sulfuric acid, of these 12-keto acids with chromic acid as oxidizing agent gives rise to a diketo *10,11*[9,10]-octadecenoic acid.

The oxidation is carried out by means of excess chromic acid over that required to oxidize a methylene group in the molecule, approximately 400% excess being preferred for optimum yields. The reaction time varies with the temperature. For example, about one-half to about two hours, at a temperature of about 40°–50° C. or several minutes at 70°–80° C. have been found to be effective. The solvent medium is glacial acetic acid, which is used in excess over that required for a single phase reaction medium, there being excess free sulfuric acid also present. It suffices to have about 10 to 16 mls. of glacial acetic acid present per gram of 12-keto octadecenoic acid, and about three times as much $H_2SO_4$ present as is required to form chromic acid with the soluble dichromate used.

The following examples illustrates the invention.

EXAMPLE 1

An oxidizing solution of 40 grams sodium dichromate dihydrate in 200 mls. water, 20 mls. concentrated sulfuric acid, 98.6%, and 100 mls. glacial acetic acid was added with stirring to a solution of 25 grams of 12-keto oleic acid in 100 mls. glacial acetic acid.

The reaction medium was kept at 40–45° C. for 1 hour by means of a cooling bath, the reaction then being terminated by drowning in water. Crude diketo *10,11*[9,10]-octadecenoic acid was filtered off, washed, and dried at room temperature. A yield of 17 grams of white crystalline product, melting at 105°–108° C. was obtained. It was recrystallized from 350 mls. of 90% ethanol to give 15 grams of white product melting at 111°–113° C. Further recrystallization from diethyl ether gave a product melting at 112°–113° C.

EXAMPLE 2

The process of Example 1 was repeated, using double quantities of all reactants, and the reaction was terminated at the end of 30 minutes. The crude diketo *10,11*[9,10]-octadecenoic acid obtained was dried overnight and recrystallized from 600 mls. of 90% ethanol. A yield of 28 grams of white needles, melting at 112°–113° C. was obtained.

EXAMPLE 3

An oxidizing solution of 40 grams sodium dichromate dihydrate in 200 mls. water, 20 mls. concentrated sulfuric acid, and 200 mls. glacial acetic acid, was added with stirring to a solution of 25 grams 12-keto elaidic acid in 200 mls. glacial acetic acid.

The temperature was held at 45–50° C. for 2 hours, then the reaction was terminated by drowning with water. Crude diketo *10,11*[9,10]-octadecenoic acid was filtered off, washed and dried, the 18 grams of product recovered melting at 100–105° C. The crude product was recrystallized from 350 mls. of 90% ethanol, the 12 grams of crystalline product then recovered having a melting point of 112°–113° C.

EXAMPLE 4

The procedure of Example 3 was repeated, the reaction then being terminated after 30 minutes. A crude product, 17 grams, having a faint pink tinge was recovered, which had a melting point of 95–103° C., indicating the presence of unoxidized 12-keto elaicid acid. The crude was recrystallized from 3 liters of diethyl ether, and 7 grams of product, melting at 112°–113° C. was recovered.

It has been found that 12-keto elaidic acid is more difficult to oxidize to diketo *10,11*[9,10]-octadecenoic acid than 12-keto oleic acid, as would be expected, since a trans double-bonded compound is generally more resistant to oxidation than is a cis double bonded compound.

EXAMPLE 5

An oxidizing solution of 40 grams sodium dichromate dihydrate in 200 mls. water, 20 mls. concentrated sulfuric acid, and 100 mls. glacial acetic acid was added with stirring to a solution of 25 grams of methyl 21-keto oleate in 200 mls. glacial acetic acid.

The solution was warmed at 40–45° C. and kept at that temperature for 30 minutes. The reaction medium was then drowned in water, crude methyl diketo *10,11*[9,10]-octadecenoate was filtered off and washed, and the water wet crude taken up in 500 mls. petroleum ether, 30–60° C. boiling range. An insoluble residue of 0.4 gram, melting at 50–90° C., was filtered off at room temperature. The petroleum ether solution of crude was washed with 300 mls. 10% potassium carbonate solution and three times with water, dried with anhydrous sodium sulfate, evaporated down to about 300 mls., and cooled in a dry ice bath. A yield of 6.7 grams of crystalline plates which melted at 55–56° C., was obtained.

EXAMPLE 6

An oxidizing solution of 40 grams sodium dichromate dihydrate in 200 mls. water, 20 mls. concentrated sulfuric acid, and 100 mls. glacial acetic acid was added with stirring to 25 grams methyl 12-keto oleate in 200 mls. glacial acetic acid, warmed to 70–80° C., and kept at that temperature for 3 minutes. The oxidation was then terminated by drowning in water, and the crude methyl diketo *10,11*[9,10]-octadeconate filtered off and washed. The crude precipitate was taken up in 500 mls. petroleum ether, the solution separated from 0.3 gram of insoluble precipitate melting at 104–106° C., the petroleum ether solution washed with 300 mls. 10% potassium carbonate solution and three times with water, and solution dried with anhydrous sodium sulfate. The petroleum ether solution was evaporated down to about 300 mls. and cooled in a dry ice bath. A yield of 5.0 grams of crystalline plates melting at 56°–57° C. was recovered.

EXAMPLE 7

An oxidizing solution of 32 grams sodium dichromate dihydrate in 160 mls. water, 16 mls. concentrated sulfuric acid, and 80 mls. glacial acetic acid was added with stirring to a solution of 20 grams methyl 12-keto oleate in 160 mls. glacial acetic acid.

The reaction medium was warmed to 70°–80° C. and kept at that temperature for 2.5 minutes. The oxidation was terminated by drowning in water, and the crude methyl diketo-*10,11*[9,10]-octadecenoate was filtered off, washed, and taken up in 400 mls. petroleum ether. An insoluble precipitate melting at 60°–92° C. in the amount of 0.3 gram was filtered off. The petroleum ether solution was washed with 300 mls. 10% potassium carbonate solution, three times with water, then dried with anhydrous sodium sulfate. The dry petroleum ether solution was then evaporated down to about 300 mls. and cooled in a dry ice bath. A yield of 6.2 grams of crystalline plates, melting at 55°–56° C., was recovered.

The diketo-*10,11*[9,10]-octadecenoic acid, obtained, as indicated earlier, either by oxidation of 12-keto oleic acid or of 12-keto elaidic acid, was purified by recrystallization from ethanol and ethyl ether, several times from each, and a final product melting at 112–113° C. was recovered. It had a carbon content of 69.41% and a hydrogen content of 10.07, compared with the theoretical of 69.65% carbon and 9.74% hydrogen for diketo-*10,11*[9,10]-octadecenoic acid, $C_{18}H_{30}O_4$. Its molecular weight, by titration with standard base, was 310.9 versus 310.4 of theory. As expected, it decolorized bromine solution. Disruptive oxidation of the diketone with potassium permanganate gave azelaic acid, M. P. 105–106° C. (no depression in M. P. on admixture with pure azelaic acid), and what apepared to be a mixture of heptylic and caproic acids. The carbonyl value of the diketone (Leithe) was 363 compared with 359.1 of theory. The diketone showed an absorption peak in the ultraviolet spectrum at 2310 A°

$$(E^{1\%}_{1\,cm.} \text{ at } 2310\ A^\circ = 399)$$

Oxirane oxygen determination by the procedure of Swern et al., J. Ind. Eng. Chem., Anal. Ed., 19:414 (1947), indicated the absence of oxido oxygen.

The melting point of the white needle-like crystals of methyl ester of diketo-*10,11*[9,10]-octadecenoic acid was 58–59° C., after crystallization twice from methanol and twice from petroleum ether. Analysis for carbon and hydrogen gave a carbon content of 70.90% (70.34%) (theory) and a hydrogen content of 9.95% (9.94% theory) for $C_{19}H_{32}O_4$.

I claim:

1. A member of the group consisting of diketo-*10,11*[9,10]-octadecenoic acid and esters thereof, said diketo acid having an empirical formula of $C_{18}H_{30}O_4$, and a melting point of 112–113° C.

2. Methyl ester of diketo-*10,11*[9,10]-octadecenoic acid having the empirical formula $C_{19}H_{32}O_4$, and having a melting point of 58–59° C.

3. Method for the oxidation of a member of the group consisting of 12-keto-9, 10-octadecenoic acids and esters, thereof, which comprises oxidizing a member of the group indicated with excess chromic acid over that required to form a second keto group in the presence of sulfuric acid, the reaction medium being a solution of the reactants in glacial acetic acid, thereafter terminating the reaction, and separating and recovering a member of the group consisting of diketo-*10,11*[9,10]-octadecenoic acid and esters thereof, the reaction time not exceeding two hours and the reaction temperature not exceeding 80° C.

4. In a method for the oxidation of a member of the group consisting of 12-keto-9, 10-octadecenoic acids and esters thereof to form a member of the group consisting of diketo-*10,11*[9,10]-octadecenoic acid and esters thereof, the step which comprises oxidizing a member of the group indicated with excess chromic acid in the presence of sulfuric acid the reaction medium being a solution of the reactants in glacial acetic acid, the reaction time not exceeding two hours and the reaction temperature not exceeding 80° C.

References Cited in the file of this patent or the original patent

UNITED STATES PATENTS

| Number | Name | Date |
|---|---|---|
| 2,446,849 | Price | Aug. 10, 1948 |

OTHER REFERENCES

Ellis: J. Chem. Soc. (London), Jan. 1950, pages 9–12.